Feb. 12, 1929.
J. F. LAMB
1,701,858
SOLDERING IRON
Filed Jan. 29, 1925
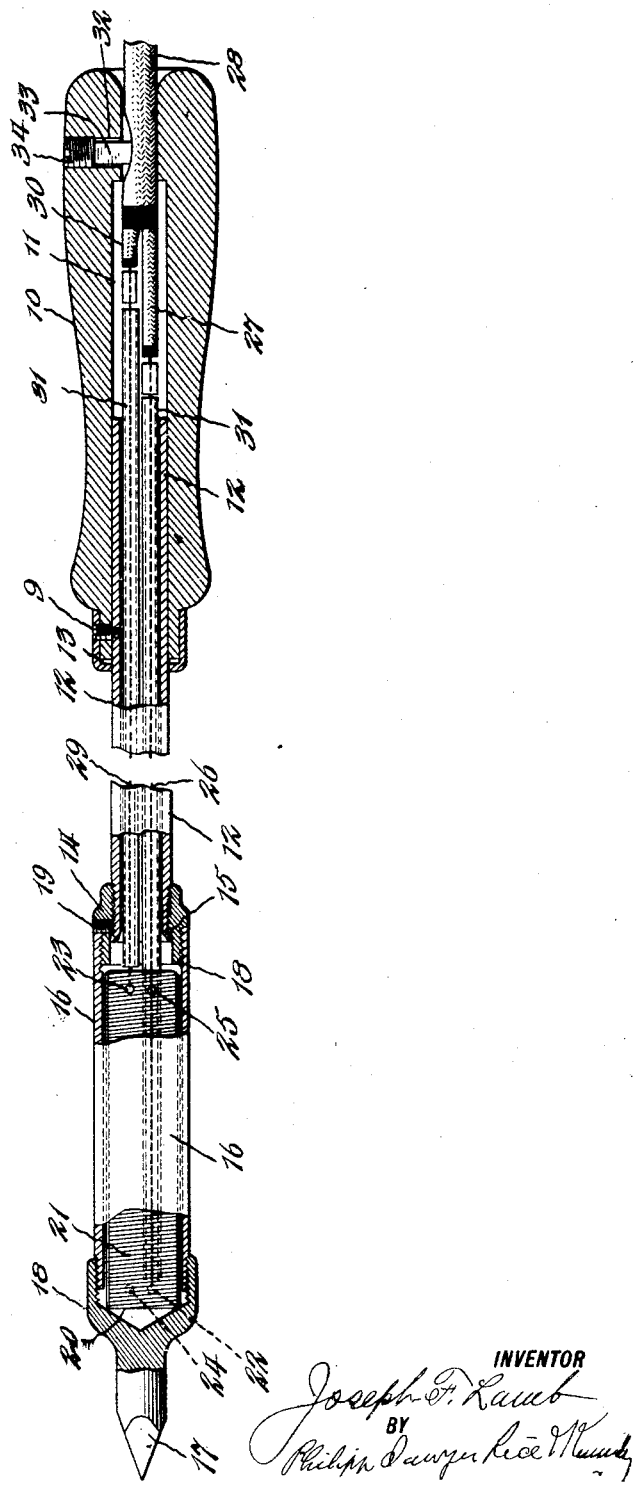
INVENTOR
Joseph F. Lamb
BY Patented Feb. 12, 1929.

1,701,858

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

SOLDERING IRON.

Application filed January 29, 1925. Serial No. 5,660.

This invention relates to improvements in soldering irons.

It is the principal object of the invention to provide an electric soldering iron such that the internal parts are not subjected to any pulling or twisting of the conductor cord, and one that is readily assembled and disassembled and that is economical to manufacture.

With this general object in view the invention consists in the features, combinations, details of construction and arrangements of parts which will first be described in connection with the accompanying drawing and then more particularly pointed out.

The drawing is a longitudinal sectional view, with parts in elevation, of a soldering iron constructed in accordance with the invention.

Referring to the drawing, the soldering iron illustrated as an example comprises a wooden handle 10 having an axial bore 11. Extending well into this bore is a tubular element 12. On the handle and bent over the end thereof is a ferrule 13. A threaded pin 9 passes through the ferrule, handle and tubular element to anchor the latter in position.

Connected with the tubular element 12 is a housing carrying a soldering point and in constructions embodying the invention to the best advantage the housing is open-ended and the soldering point serves also as a cap or cover. As here shown as an example, the outer end of the tubular element 12 is threaded on the exterior. Threaded onto this end is a sleeve-like coupling 14 which has an internal shoulder 15 beyond which the end of the tube 12 extends. The other end of the coupling has an exterior thread to receive the threaded end of a housing 16 which is in the form of a cylindrical tube. At the outer end, the housing 16 has an outside thread to receive a combined cap and soldering element comprising the soldering point 17 and the cap portion 18, into which the heating element, described below, extends.

In order to prevent relative axial movement of the tube 12 and the housing, as here shown as an example, the rim or end of tube 12 is turned or spun down on shoulder 15 of the coupling as illustrated in the drawing. This is done during assembly, after coupling 14 has been threaded onto the tube and before housing 16 is threaded onto the coupling. A screw 19 is passed through the housing and coupling to prevent relative rotation of these parts.

There is provided an electric resistance heating unit enclosed in the housing. As here shown as an example, the unit comprises an insulating base 20 of lavite or the like wound with a resistor wire 21. This wire is in connection with two terminals 22, 23, located at opposite ends of the base 20. As shown, the unit has two additional terminals 24, 25, symmetrical with respect to terminals 22, 23, so that the unit may be assembled either end first. The unit, as shown, is loosely mounted in the housing 16 without any fastening devices.

From the terminal 22 a lead wire 26 extends along the unit and through the tube 12 into the rear part of handle bore 11 where it is connected with one conductor 27 of a cord or cable 28 which extends a short distance into the bore. A similar lead wire 29 connects terminal 23 with the other conductor element 30 of the cord. It is to be understood that the cord 28 is of sufficient length to enable the iron to be connected in a power circuit in the usual manner. Between the base 20 and the ends of the cable conductors, the wires 26, 29 are enclosed in sheathings or casings 31 of porcelain or other suitable material.

It is noted that the wiring of the device, just described, is illustrated more or less diagrammatically.

The invention in its entirety includes an anchoring device for the cord or cable, and in structures embodying the invention to the best advantage the cord is clamped or jammed against one side of the bore. As here shown as an example the bore 11, near the end of the handle is of a diameter to somewhat closely fit the cord 28. Extending transversely through the handle near the rear end is a radial bore 32 opening into bore 11. In this bore or recess 32 is located an abutment block 33 of fibre or other suitable material. This block engages the cord 28 transversely. The block is forced against the cord by means of a plug 34 threaded into the bore 32. When the plug 34 is driven home the block 33 is forced against cord 28 and clamps or jams the same against the opposite side of the handle bore. This firmly anchors the cord at this point. With this construction, any twisting or pulling of the cord is not transmitted beyond the point of anchorage, and, as the iron is used the heating unit and its connections are free from any pulling or twisting strains.

The iron described is easily and economically assembled and the construction is such that disassembly for repairs and the like is easily made. The soldering point, telescoping outside the housing acts as a removable cap for the open-ended housing and permits the heating unit to occupy substantially all the internal space of the housing.

As will be understood, when the heating unit is connected in a suitable circuit the heat set up in the resistor wire is conducted to the soldering point 17 to heat the same for use.

What I claim is:

A soldering iron comprising a housing, a heating unit mounted in said housing, a handle having an axial bore, conductor elements extending into said bore and having connection with said heating unit, said handle having a radial recess opening into said bore, an insulating block in said recess, and a screw plug in said bore for forcing the insulating plug against the conductor elements to clamp the latter against the side of the bore.

In testimony whereof, I have hereunto set my hand.

JOSEPH F. LAMB.